United States Patent Office

3,787,497
Patented Jan. 22, 1974

3,787,497
METHOD FOR RECOVERING ASHLESS LUBRICATING OIL DISPERSANT
Walter W. Hellmuth and Edward F. Miller, Beacon, N.Y., assignors to Texaco Inc., New York, N.Y.
No Drawing. Filed Dec. 23, 1971, Ser. No. 211,774
Int. Cl. C07c 85/16
U.S. Cl. 260—583 N          10 Claims

ABSTRACT OF THE DISCLOSURE

Method of recovering polyisobutenyl-substituted polyalkylenepolyamine ashless nitrogen-containing dispersants for lubricating oil compositions employing alcohol extraction.

BACKGROUND OF THE INVENTION

Field of the invention

It is conventional to employ nitrogen-containing dispersants and/or detergents in formulated lubricating oil compositions. The dispersants function to keep foreign insoluble particulates dispersed throughout the lubricant so that they can be filtered out and also to prevent the deposition and accumulation of these bodies on critical areas of the engine.

Nitrogen-containing dispersants are prepared as a reaction product of an amine or polyamine with a chlorinated polyolefin having sufficient molecular weight to impart oil solubility to the reaction product, generally in the presence of a hydrogen chloride acceptor, followed by a partially aqueous or aqueous washing step resulting in the production of an oil soluble product containing from about 0.5 to 5 percent nitrogen. While effective dispersants can be prepared by the foregoing method, the method leaves much to be desired. Generally, this method requires extended processing time. This is because the reaction mixture which has been treated with an aqueous wash is prone to the formation of an emulsion which complicates the recovery procedure. Not infrequently, the product recovered is hazy and unsuitable for the preparation of a premium quality lubricating oil composition.

Description of the prior art

U.S. Pat. 3,275,554 discloses ashless polyolefin substituted polyamines prepared by reacting polyisobutenyl chloride with tetraethylenepentamine, dissolving the reaction product in pentane and washing with water until chlorine-free.

U.S. Pat. 3,565,804 discloses the method of preparing dispersants by reacting halogenated polyisobutylene with a polyalkylene polyamine. The recovery steps disclosed include washing with water, washing with aqueous sodium carbonate and employing mixed hexane-alcohol or aqueous alcohol solutions, water being present in all of the final recovery steps.

SUMMARY OF THE INVENTION

An improved method for recovering a nitrogen-containing lubricating oil dispersant reaction product prepared by reacting a halogenated polyolefin with a polyalkylenepolyamine to form a reaction mixture containing said dispersant is provided which comprises extracting a hydrocarbon solution of said reaction mixture with an aliphatic alcohol having from 1 to 6 carbon atoms and recovering an effective nitrogen-containing dispersant.

DETAILED DESCRIPTION OF THE INVENTION

A valuable class of nitrogen-containing lubricating oil dispersants are prepared in the reaction of a halogenated polymer or polyolefin with an alkylenediamine. This reaction can be conducted in the presence of an inert hydrocarbon solvent. This reaction causes the splitting off of a hydrogen halide and the formation of a polyolefinalkylenediamine dispersant, as disclosed in U.S. Pats. 3,275,554 and 3,565,804, the disclosures of which are incorporated herein, followed by a variety of treating processes to effect the recovery of the desired nitrogen-containing dispersant product.

In accordance with this invention, the nitrogen-containing dispersant reaction product in admixture with a hydrocarbon solvent is extracted with a lower aliphatic alcohol or mixture of alcohols. The extraction solvents are extremely effective for removing the unreacted polyamine component added in the initial reaction and prevent or inhibit the formation of an emulsion in the reaction mixture. In a preferred sequence of steps, the nitrogen-containing polyolefin-polyalkylenepolyamine dispersant reaction mixture is filtered to remove any insoluble material in the reaction mixture followed by extraction with an aliphatic alcohol.

The polyolefin-polyamine dispersant can be readily recovered from the hydrocarbon solution of the reaction product subsequent to the above steps. The hydrocarbon solvent may be distilled from the reaction mixture under atmospheric or under reduced pressure. Alternately, a mineral oil, preferably of lubricating quality can be added to the reaction mixture and this mixture then distilled as above to remove any lighter, non-lubricating hydrocarbon solvents.

The initial reaction between the halogenated polymer and the polyalkylene polyaminne can be conducted neat, i.e. in the absence of a solvent, or it can be conducted in the presence of a light hydrocarbon solvent. If a solvent is not initially employed, the reaction product is dissolved in a hydrocarbon solvent prior to the extraction step.

Hydrocarbon solvents which are particularly useful for the dispersant reaction product are the lower, normally liquid aliphatic hydrocarbons, i.e. the aliphatic hydrocarbons having from about 5 to 12 carbons atoms or mixtures thereof. Suitable hydrocarbon solvents are n-hexane, n-heptane, iso-octane, n-octane, isopentane, and n-decane, with the preferred solvent being the $C_6$ to $C_8$ aliphatic hydrocarbons.

The hydrocarbon solution of the nitrogen-containing dispersant is mixed with the extraction solvent according to the recovery process of the invention. In general, it is advantageous to first filter the hydrocarbon solution of any insoluble matter present in the reaction product by conventional means. A suitable quantity of the aliphatic alcohol extractant is added and the mixture is thoroughly agitated to insure complete dispersion of the extractant throughout the hydrocarbon phase. The aliphatic alcohol will selectively absorb the unreacted polyalkylene polyamine or polyalkylene polyamine hydrohalide byproducts.

Suitable aliphatic alcohol extraction solvents are the lower aliphatic alcohols having up to about 6 carbon atoms. They can be represented by the formula ROH in which R is an alkyl radical having from 1 to 6 carbon atoms. Specific alcohols which are effective include methanol, ethanol, isopropanol, n-butanol, isobutanol, n-pentanol and n-hexanol. Mixtures of these alcohols, such as equal parts of methanol and isopropanol are also highly effective. The amount of the extractant alcohol employed is not critical so long as enough is used to extract the unreacted polyalkylene polyamine from the mixture containing the reaction product.

The extraction solution is separated from the hydrocarbon solution by a conventional separation means, such as phase separation or other convenient means. The nitrogen-containing dispersant is then recovered from the hydrocarbon solution or it is transferred to an oil carrier which then provides a convenient vehicle for utilizing the dispersant. In the first way noted, the hydrocarbon solvent is separated from the dispersant by distillation under atmospheric or reduced pressure. In the latter method, an oil of lubricating viscosity is added to the hydrocarbon solution of the dispersant and thoroughly mixed therewith. Thereafter, the original light hydrocarbon solvent is removed from the mixture by distillation or other effective means.

The following examples illustrate the conventional methods of preparing the nitrogen-containing dispersant as well as the recovery method of this invention.

EXAMPLE I

Polyisobutylene (6035 g.; 5 mole) was heated to 250° F. and chlorine gas bubbled through at 500 cc./min. until a net weight increase of 177 g. was obtained. After blowing the reaction mixture with nitrogen gas for ½ hour, the product contained 2.77% w. chlorine.

To 3500 g. of the polyisobutenyl chloride prepared as described above, was added 641 g. of pentaethylenehexamine and 159 g. sodium carbonate, and the stirred mixture heated to 390–400° F. for 5 hours. A slow stream of nitrogen passing through the reaction mixture aided in the removal of volatile products formed in the reaction. The reaction was cooled to 150° F., taken up in 4 liters of hexane and filtered. The filtered solution was then extracted with methanol and the reaction product isolated by removing solvent by distillation at reduced pressure. A quantity of 2432 g. of product was obtained, with a nitrogen content of 1.7%.

EXAMPLE II

To 900 g. of polyisobutenyl chloride dissolved in 600 ml. xylene, was added 115 g. of 2-(2-aminoethylamino)-ethanol, and 115 g. of sodium carbonate. The stirred mixture was heated to reflux under a nitrogen atomsphere for 5 hours. The reaction mixture was filtered, solvent removed by distillation, and the residue taken up in heptane and extracted with methanol. The heptane solvent was removed by distillation at reduced pressure to give 690 g. of a product containing 0.80 weight percent nitrogen.

EXAMPLE III

Using the procedure described in Example II, 900 g. of polyisobutenyl chloride in 600 ml. xylene was reacted with 91 g. of N-aminoethylpiperazine, and 74 g. of sodium carbonate to give 616 g. of a product containing 1.1 weight percent nitrogen.

EXAMPLE IV

Polypropylene with a molecular weight of 840 was heated to 200° F. and chlorine gas added at a rate of 300 cc./min. until a net weight increase of 83 g. was obtained. After blowing the reaction mixture with nitrogen for ½ hour, a product containing 3.40 weight percent chlorine was obtained.

To 2400 g. of the chlorinated polypropylene obtained above, was added 487 g. of pentaethylenehexamine and 138 g. of sodium carbonate. The reaction mixture was then heated to 390–400° F. for four hours under a slow stream of nitrogen, and filtered. The filtrate was taken up in 4 liters of isooctane and alcohol extracted. The solvent was stripped off under reduced pressure to give 1950 g. of a product containing 2.40 weight percent nitrogen.

The effectiveness of the aliphatic alcohol extractants of the invention varies greatly with the nature of the reaction product mixture being treated. For example, if a nitrogen-containing dispersant reaction product is diluted with an equal volume of a light distillate hydrocarbon such as heptane, an alcohol, such as methanol, will permit effective extraction and undergo phase separation in a matter of minutes. If the dispersant is dissolved in an equal volume of an oil of lubricating viscosity, the same alcohol will require 4–5 hours until phase separation. In the latter instance te use of a 75/25 ethanol-water extraction solvent caused the formation of a heavy emulsion which persisted after standing for 8 hours without phase separation. The following table compares the separation times of various extraction solvents in treating a chlorined polybutene/pentaethylenehexamine reaction product diluted with heptane to give a mixture containing about 50% of heptane, designated Solution A.

TABLE I

Comparison of phase separation times for water, aqueous ethanol, and methanol extraction solvents Extraction solution:
  Water _____ Solution A
  50/50 ethanol-water __ No break in 8 hours.
  75/25 ethanol-water __ Do.
  90/10 ethanol-water __ Slight phase separation after 7 hours.
  Methanol _____ 4 hours to sharp break.
                        20 mins. to separation.

The effectiveness of the dispersant prepared by the method of the invention was determined in Bench Sludge Tests in comparison to conventional disperstants. The base oil employed in these tests (designated Base Oil A) was an SAE-30 single grade crankcase motor oil containing a balanced blend of conventional motor oil additives including an alkaline detergent, a zinc dithiophosphate and a pour depressant but no dispersant. The mineral oil component of the base oil was a refined paraffinic oil having an SUS viscosity at 100° F. of about 424 and at 210° F. of about 59. The dispersant employed in the comparison oil was a commercial dispersant characterized as an alkenylsuccinic anhydride - tetraethylenepentamine reaction product.

In the Bench Sludge Tests, formulated oils containing particulate solid matter are prepared and thoroughly agitated to evenly disperse the particulate matter throughout the oil. The oil compositions are then centrifuged and the depth of sediment is measured and compared against a standard to show the effect of the dispersant. Bench Sludge II differs from the Bench Sludge I test, in that engine blow-by is included in the test mixture to increase test severity. In general, values of 0.8 or less in the Bench Sludge I, and 1.8 or less in the Bench Sludge II tests are indicative of good dispersant formulations. The test results are set forth in Table II below:

TABLE II.—BENCH SLUDGE TEST

| Oil | A | B | C | D |
|---|---|---|---|---|
| Bench Sludge I | 0.2 | 0.1 | 0.1 | 0.1 |
| Bench Sludge II | 1.0 | 0.7 | 0.8 | 1.0 |

Oil A contained the commercial disperstant at 0.07 N, Oil B contained Example I dispersant at 0.081% N, Oil C contained Example II dispersant at 0.03 N, Oil D contained Example III dispersant at 0.044% N.

The foregoing tests show that the dispersants of the invention are highly effective for preventing the deposition of sludge.

The motor oil compositions of the invention were also tested in the MS-VB and TDST-II engine tests.

The MS-VB test is conducted closely in accordance with the procedure described in ASTM Special Technical Publication No. 315-C with only minor variations made to increase severity beyond that normally exhibited by this test.

The TDST-II engine test is a severe diesel engine test conducted in a 1Y73 single cylinder Caterpillar Diesel Lubricants Test Engine is run under the following conditions.

TDST-II OPERATING CONDITIONS

| | |
|---|---|
| Test duration, hrs. | 50 |
| Engine speed, r.p.m. | 1800 |
| Power output, B.H.P. | 56 |
| Oil temp. to bearings, °F. | 265 |
| Fuel flow, lbs./hrs. | 23.0 |
| Oil change, qts. | 3.0 |
| Oil pressure, p.s.i. | 30 |
| Fuel, percent S | 1.0 |

Results range from 0 to 300 demerits with a range of 80–120 approximating a quality level capable of passing a Caterpillar 1–H test in accordance with the accepted limits.

Base Oil A described above was employed to prepare the oil compositions for the engine tests. An oil containing the dispersant of the invention was compared to a variety of commercial dispersant-containing oils. The results are set forth in Table III.

TABLE III.—ENGINE TESTS

| Oil | A | B | C | D |
|---|---|---|---|---|
| MS-VB test: | | | | |
| Average sludge | 8.6 | 8.5 | 8.7 | 9.4 |
| Average varnish | 7.0 | 6.0 | 7.4 | 7.6 |
| Piston skirt varnish | 8.3 | 7.5 | 8.7 | 9.0 |
| TDST-II test (demerits) | 83 | 97 | 86 | 81 |

Oil A contained a commercial thiophosphonate dispersant at 0.075% P, Oil B contained a commercial alkenylsuccinic anhydride tetraethylenepentamine reaction product dispersant at 0.07% N, Oil C contained a commercial amine type dispersant at 0.07% N, Oil D contained the dispersant of Example I at 0.08% N.

The foregoing engine tests demonstrate the outstanding effectiveness of the dispersant of the invention as compared to a number of commercial motor oil dispersants.

We claim:

1. A method for recovering a nitrogen-containing lubricating oil dispersant reaction product prepared by the reaction of a halogenated polyolefin with a polyalkylene polyamine, which consists essentially of providing a hydrocarbon solution of said reaction product, extracting said hydrocarbon solution with an aliphatic alcohol having from 1 to 6 carbon atoms and recovering an effective nitrogen-containing dispersant.

2. A method according to claim 1 in which said hydrocarbon is an aliphatic hydrocarbon having from 5 to 12 carbon atoms.

3. A method according to claim 1 in which said halogenated polyolefin is a chlorinated polyisobutylene having a molecular weight ranging from 500 to 2500.

4. A method according to claim 1 in which said polyalkylene polyamine is tetraethylene pentamine.

5. A method according to claim 1 in which said aliphatic alcohol is methanol.

6. A method according to claim 1 in which said aliphatic alcohol is ethanol.

7. A method according to claim 1 in which said aliphatic alcohol is isopropanol.

8. A method according to claim 1 in which said aliphatic alcohol is a mixture of methanol and isopropanol.

9. A method according to claim 1 in which the hydrocarbon solution of said reaction product is filtered prior to the extraction step.

10. A method according to claim 1 in which recovery is effected by mixing said extracted hydrocarbon solution of said dispersant in a mineral lubricating oil and then separating said hydrocarbon solution.

References Cited
UNITED STATES PATENTS

| 3,275,554 | 9/1966 | Wagenaar | 252—50 |
| 3,565,804 | 2/1971 | Monnen et al. | 252—050 |

LEWIS GOTTS, Primary Examiner

D. R. PHILLIPS, Assistant Examiner

U.S. Cl. X.R.

252—50